US012252089B2

(12) United States Patent
Kim et al.

(10) Patent No.: US 12,252,089 B2
(45) Date of Patent: Mar. 18, 2025

(54) STEERING WHEEL (71) Applicant: Autoliv Development AB, Vargarda (SE)

(72) Inventors: Jinkeun Kim, Kanagawa (JP); Hiroyasu Kumagawa, Kanagawa (JP); Rodel Go, Kanagawa (JP); Hiroaki Asai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/291,103

(22) PCT Filed: Jul. 21, 2022

(86) PCT No.: PCT/JP2022/028331
§ 371 (c)(1),
(2) Date: Jan. 22, 2024

(87) PCT Pub. No.: WO2023/008304
PCT Pub. Date: Feb. 2, 2023

(65) Prior Publication Data
US 2024/0227716 A1 Jul. 11, 2024

(30) Foreign Application Priority Data
Jul. 27, 2021 (JP) ................................. 2021-122214

(51) Int. Cl.
*B60R 21/203* (2006.01)
*B62D 1/04* (2006.01)

(52) U.S. Cl.
CPC ............ *B60R 21/2035* (2013.01); *B62D 1/04* (2013.01)

(58) Field of Classification Search
CPC ... B60R 21/2035; B60R 21/2037; B62D 1/04; B62D 7/222
See application file for complete search history.

(56) References Cited

U.S. PATENT DOCUMENTS

| | | | |
|---|---|---|---|
| 2005/0230943 A1* | 10/2005 | Thomas | B60R 21/2037 |
| | | | 200/61.55 |
| 2018/0215337 A1* | 8/2018 | Burel | B60R 21/2037 |

FOREIGN PATENT DOCUMENTS

| | | | |
|---|---|---|---|
| DE | 102014006299 A1 * | 11/2015 | ......... B60R 21/2035 |
| JP | 11-126537 A | 5/1999 | |
| JP | 2010069938 B2 | 4/2010 | |
| JP | 2014-151779 A | 8/2014 | |
| WO | 2021/192496 A1 | 9/2021 | |
| WO | WO-2023276671 A1 * | 1/2023 | ............... B62D 1/04 |
| WO | WO-2024061791 A1 * | 3/2024 | ............. B60Q 5/003 |

\* cited by examiner

*Primary Examiner* — Drew J Brown
(74) *Attorney, Agent, or Firm* — Foley & Lardner LLP (57) ABSTRACT

A steering wheel enabling suppressing hanging down of an airbag module due to its own weight and stabilizing the position of the airbag module. The steering wheel includes a steering wheel body, an airbag module, and at least one coil spring that biases the airbag module in a direction separating from the steering wheel body. The coil spring is arranged between the steering wheel body and the airbag module in a state with the axis line thereof offset from that of a free state; thereby applying a force on the airbag module in a direction that intersects with the axis line of the coil spring in a free state.

19 Claims, 6 Drawing Sheets

FIG. 6

STEERING WHEEL

TECHNICAL FIELD

The present invention relates to a steering wheel.

BACKGROUND ART

Steering wheels having a front airbag function have been widely utilized to protect the safety of a driver. For example, with the steering wheel disclosed in Patent Document 1, an airbag device is mounted to a steering wheel body via three horn switch mechanisms using a snap fit.

RELATED ART DOCUMENTS

Patent Documents

Patent Document 1: Japanese Unexamined Patent Application 2010-69938

SUMMARY OF THE INVENTION

Problem to be Solved by the Invention

With the conventional steering wheel, after being mounted to the steering wheel body, there are cases where the airbag device hangs down due to its own weight resulting in misalignment with the steering wheel body. If this manner of offset position occurs, for example, the gap between the airbag device and the steering wheel body may be large on the upper side and smaller on the lower side, thereby degrading the creative look of the steering wheel as a whole. In addition, this may also affect other operations.

An object of the present invention is to provide a steering wheel that enables contributing to stabilizing the position of the airbag module.

Means for Solving the Problem

The steering wheel according to a first aspect of the present invention, includes:
a steering wheel body;
an airbag module; and
at least one coil spring that biases the airbag module in a direction away from the steering wheel body; wherein the at least one coil spring is arranged between the steering wheel body and the airbag module with the axis line of the coil spring in a state offset from that of a free state thereof; thereby also applying a force to the airbag module in a direction that intersects the axis line of the coil spring in a free state.

With this aspect, a bias is applied to the coil spring arranged with the axis line offset from that of a free state in a direction that intersects with the axis line of a free state. Therefore, the coil spring applies a biasing force to the airbag module in this intersect direction in addition to the direction of separating from the steering wheel body. Utilizing this force in the intersect direction enables stabilizing the airbag module position. For example, by directing this force in the intersecting direction, a direction of suppressing hanging down of the airbag module due to its own weight, the airbag module can be oriented in the original position relative to the steering wheel body.

DESCRIPTION OF THE PREFERRED EMBODIMENTS

A steering wheel according to a preferred embodiment of the present invention will be described.

The steering wheel is arranged on the driver seat side of a vehicle such as an automobile, and has a plurality of functions. For example, the steering wheel functions as a vehicle steering device. Specifically, the steering wheel is generally attached in an inclined state to an upper end section of a steering shaft provided on a vehicle body. Furthermore, steering force from the driver is transmitted from the steering wheel to the steering shaft, and transmitted to wheels via a steering gear or the like, thereby changing the direction of the wheels.

In addition, the steering wheel also functions as a front airbag in the event of a vehicle emergency. An example of a vehicle emergency is a time when a vehicle collision occurs. The steering wheel functioning as a front airbag is mainly achieved by an airbag module installed on the steering wheel body. In addition to these functions, the steering wheel may have a function as a horn device. In addition, the steering wheel may have a function as a dynamic damper for damping vibration from the vehicle to the steering wheel and this function is achieved by using the airbag module as a damper mass.

With the steering wheel of an embodiment, the airbag module is mounted to the steering wheel body via a damper unit or the like facing a first direction. The aforementioned "first direction" can be, for example, the axial direction or the longitudinal direction of the steering shaft. In the mounted state, at least one coil spring arranged between the airbag module and the steering wheel body pushes up the airbag module in a direction intersecting with the first direction; thereby stabilizing the position of the airbag module. In the following description, it is assumed that the "first direction" corresponds to the axial direction of the steering shaft.

In addition, in the following, for convenience of explanation, the three axes of XYZ are defined as follows. The axial direction (in other words, the first direction) of the steering shaft is defined as the "Z-axis direction", the direction connecting 9 o'clock and 3 o'clock on an analog 12-hour clock on a flat surface orthogonal to the Z-axis direction is defined as the "X-axis direction", and the direction connecting 12 o'clock and 6 o'clock on the same clock is defined as the "Y-axis direction". The X-axis direction can be a direction corresponding to the width direction of the steering wheel or vehicle. The Y-axis direction can be the front-to-back direction of the vehicle (direction of travel when the vehicle is going straight). A plane defined by the X-axis and the Y-axis is called an "XY plane".

Figure 1:
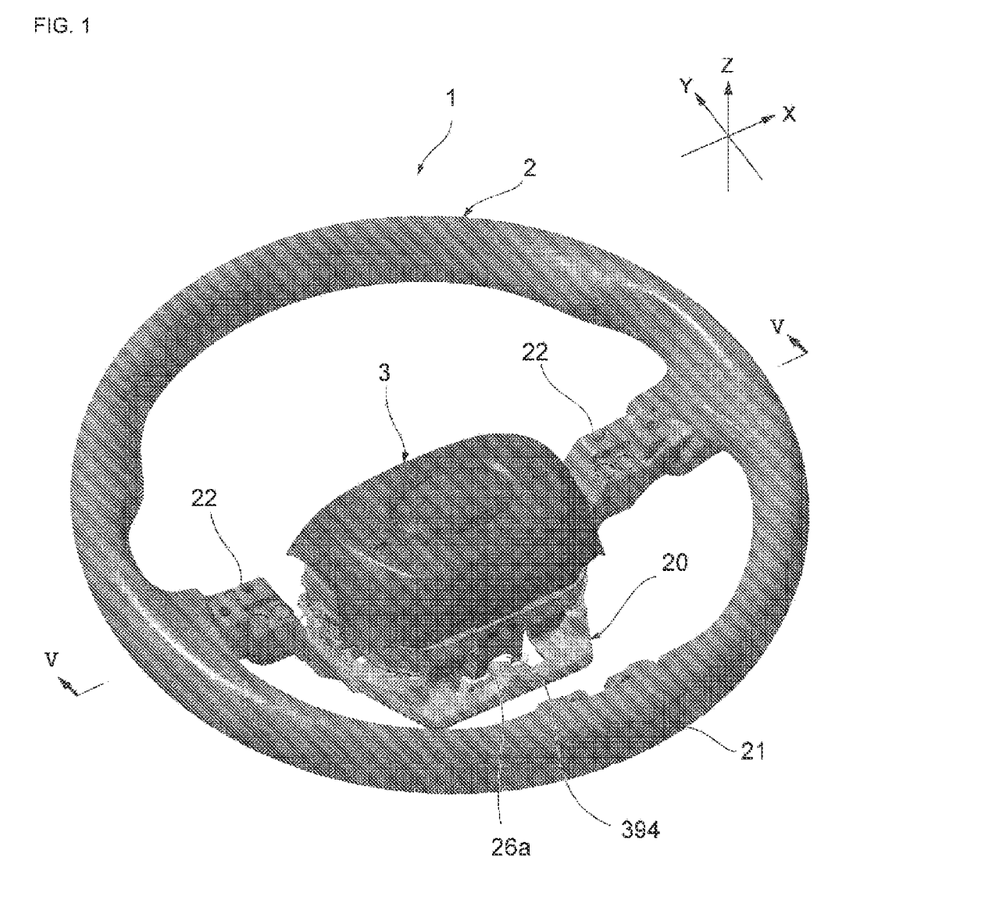
FIG. 1 is a perspective view depicting the appearance of a steering wheel according to an embodiment.

Furthermore, the directions the arrows face for the X, Y, and Z axes in FIG. 1 is defined to be the "positive side" and the opposite direction is the "negative side". Therefore, for example, the positive side in the Y-axis direction is 12 on a 12-hour analog clock and the Y-axis direction negative side is 6 on this same clock.

Figure 2:
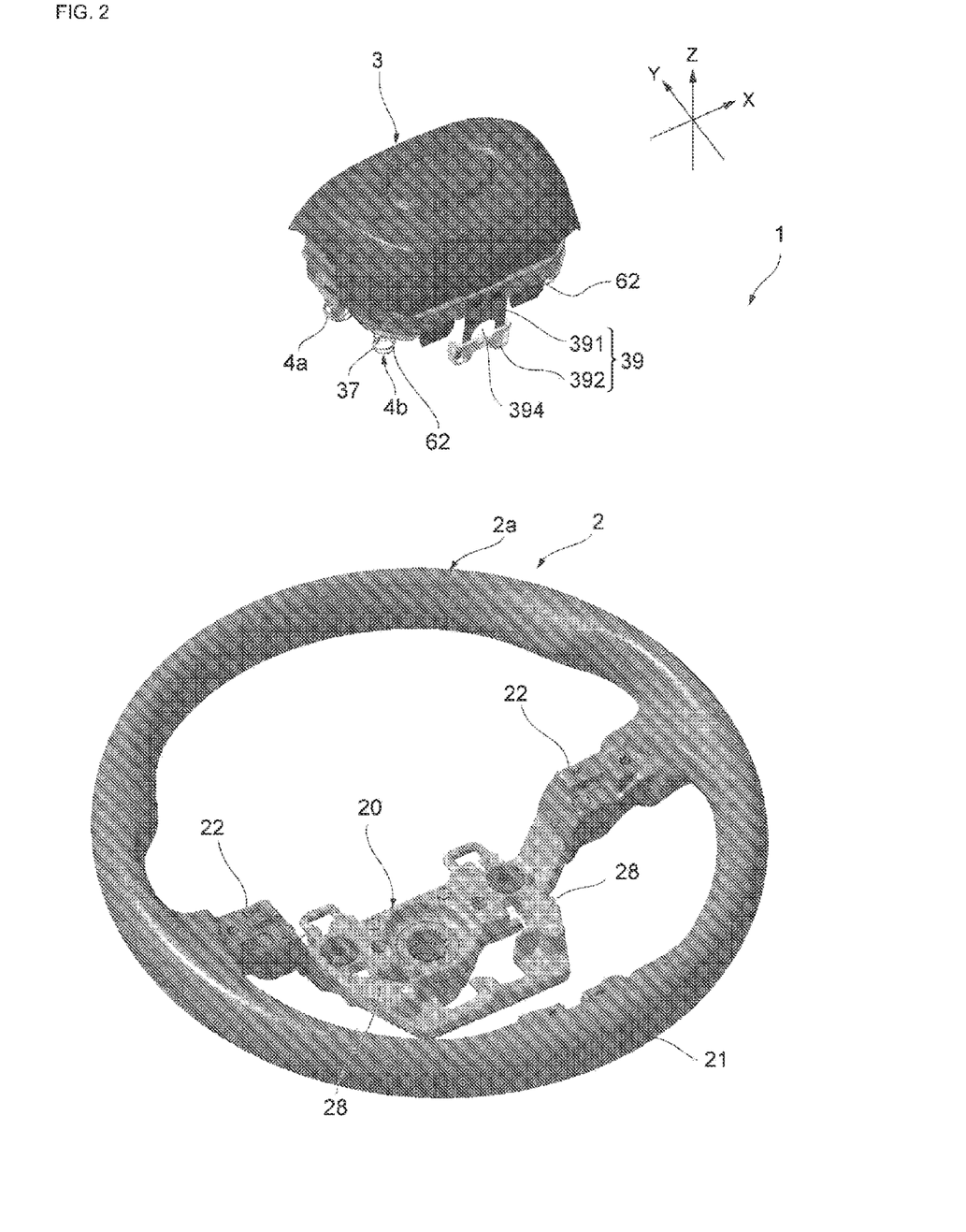
FIG. 2 is an exploded perspective view depicting a state of an airbag module having been removed from a steering wheel body regarding the steering wheel in FIG. 1.

As illustrated in FIGS. 1 and 2, a steering wheel 1 has a steering wheel body 2 and an airbag module 3. In addition, the steering wheel 1 includes a damper unit 4a and a support unit 4b. The airbag module 3 is mounted to the steering wheel body 2 facing the Z-axis direction via the damper unit 4a and the support unit 4b.

The steering wheel body 2 has a core bar 2a that constitutes the skeletal structure thereof. The core bar 2a is molded from a metal such as, for example, steel, aluminum, magnesium, or the like. The core bar 2a has a center boss part 20 and an outer circumferential rim part 21, and further spoke parts 22 that connect the boss part 20 and the rim part 21. The rim part 21 is the part that the driver grips and is formed in a circular shape. There are a plurality of spoke parts 22 (two in this case) that respectively extend from the boss part 20 outward and connect to the rim part 21. In other embodiments, there may be three or more spoke parts 22.

In addition, the steering wheel body 2 may have one or more layers on the core bar 2a. For example, a soft synthetic resin layer such as foamed polyurethane resin may be included on the rim part 21 and the spoke parts 22. The rim part 21 can have a urethane layer as an insulating layer, a heating electrode layer for heating the steering wheel body 2, a surface skin layer as an insulating layer, and a layer of sensor electrodes for detecting gripping of the steering wheel body 2 by the driver.

Figure 3:
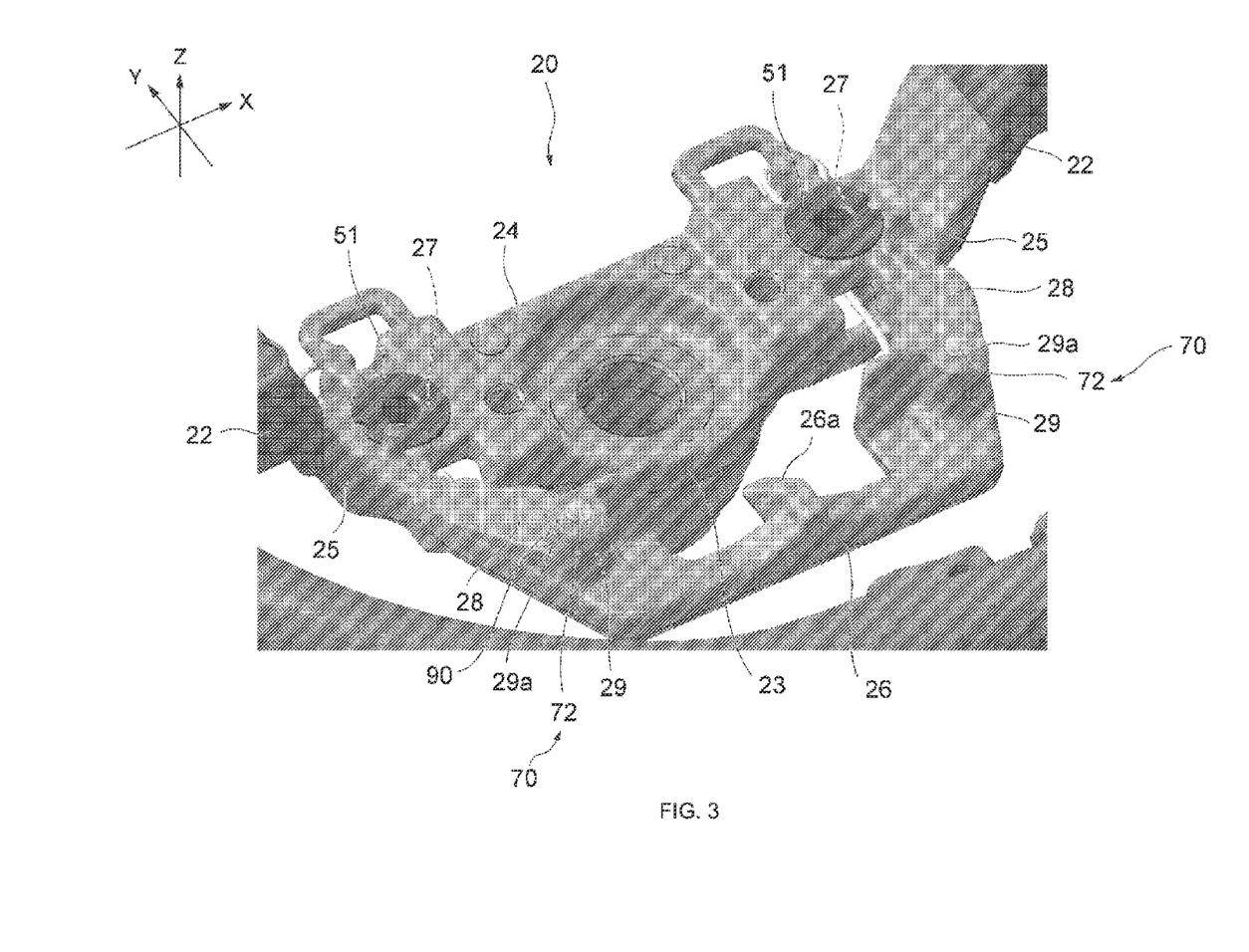
FIG. 3 is an enlarged perspective view depicting a center part of the steering wheel body in FIG. 2.

As depicted in FIG. 3, the boss part 20 includes a shaft mounting part 23 that the steering shaft 100 (see FIG. 5) is mounted to and a base part 24 formed as a recess shape in the center of the shaft mounting part 23. Inclined parts 25, 25 of the base part 24 that rise at an angle from both ends in the X axis direction thereof are connected to the spoke parts 22. In addition, a bridging part 26 positioned to the negative side in the Y-axis direction connects both ends of the base part 24 in the X-axis direction. A tab engaging part 26a protruding toward the shaft mounting part 23 is formed at the center of the bridging part 26. A tab 39 of the airbag module 3 elastically engages with a tab engaging part 26a (see FIGS. 1 and 2).

A plurality (two in this case) of mounting holes 27 and 27 are formed on both sides of the base part 24 in the X-axis direction across the shaft mounting part 23 (see FIG. 5) and a cylindrical collar 51 is installed in each mounting hole 27. A collar 51 is used to mount the damper unit 4a. For example, the collar 51 includes a flange part 53 at a first end having a notch part, part way along a cylinder part (see FIG. 5) and a pin 41, described below, of the damper unit 4a is inserted into the cylinder part.

In addition, the base part 24 has seat surfaces 28, 28 positioned more in the Y-axis negative direction than mounting holes 27, 27. The seat surface 28 receives a first end of the support unit 4b. Protruding parts 29, 29 that protrude from the surface of the base part 24 in the Z-axis direction positive side are formed between the seat surfaces 28, 28 and the bridging part 26. A fixed contact 72 of a horn mechanism 70 is provided on a top surface 29a of the protruding part 29. In addition, an interference portion 90 that interferes with a first end of the support unit 4b is provided at the root part of the protruding part 29.

Figure 4:
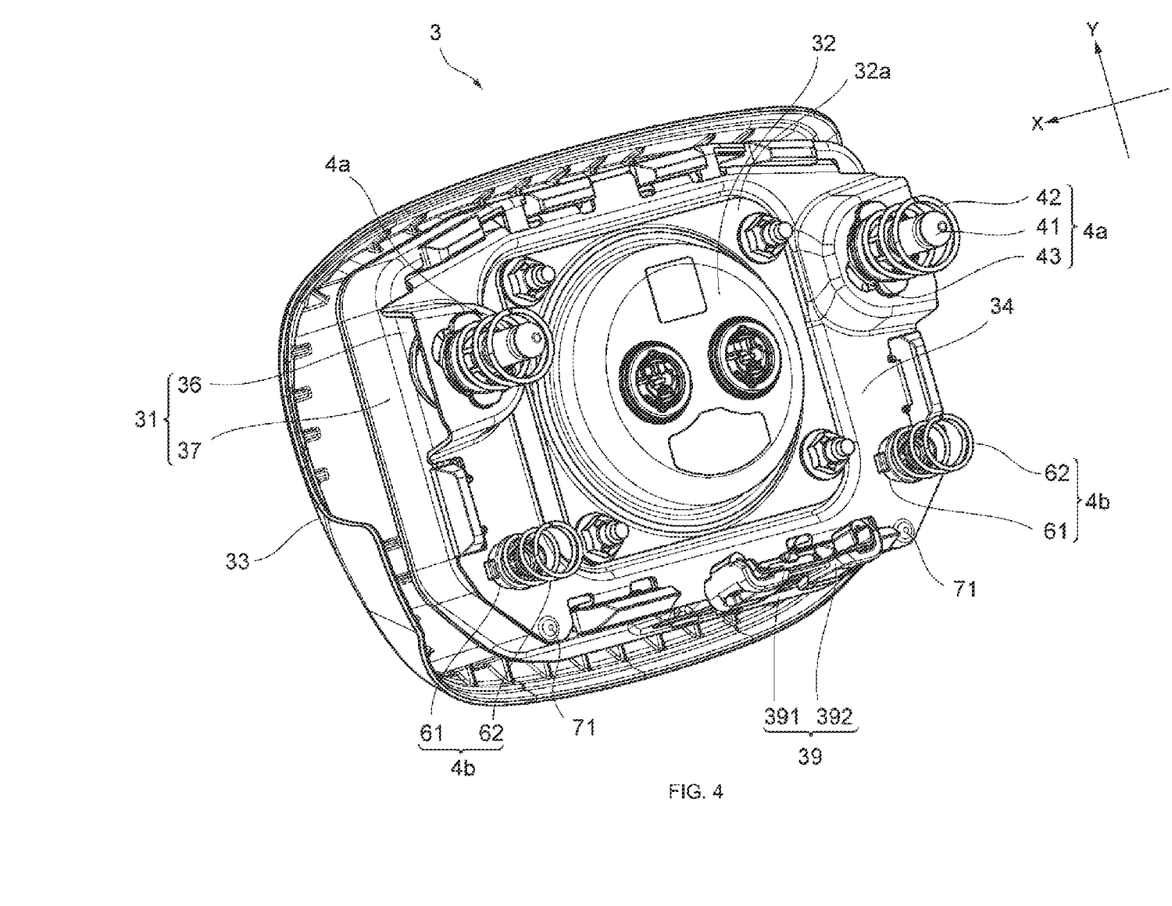
FIG. 4 is a perspective view depicting the airbag module in FIG. 2 from the bottom.

As depicted in FIG. 4, the airbag module 3 includes an airbag cushion 30 (see FIG. 5), a housing 31, an inflator 32, a module cover 33 attached to the housing 31 so as to cover the airbag cushion 30, and a locking plate 34 mounted to the housing 31. The airbag cushion 30 is in, for example, a folded state.

The housing 31 has a bottom wall 36 with a bottom surface in the XY plane and a peripheral wall 37 rising from the bottom wall 36 and overall is formed in a shallow dish shape. A bottom wall 36 has the inflator 32 mounted in the center thereof, and the locking plate 34 attached on the circumference thereof.

In addition, a spring-loaded tab 39 is mounted on the housing 31. As depicted in FIGS. 2 and 4, the tab 39 includes a cantilevered plate spring 391 and an insulator 392 provided on the free end side of the plate spring 391. The plate spring 391 has a first end mounted to the surface of the peripheral wall 37 on the Y-axis direction negative side and extends in the Z-axis direction negative side. The tab engaging part 26a is inserted into a receiving opening 394 defined by a plate spring 391 and an insulator 392. With this inserted state, the end surface (upper surface) of the insulator 392 on the receiving opening 394 side is in contact with or faces the lower surface of the tab engaging part 26a, or the surface of the insulator 392 on the Y-axis direction negative side is in elastic contact with the root portion (side surface of the core bar 2a bridging part 26) of the tab engaging part 26a. Therefore, vibration of the steering wheel body 2 is dampened by the elastic action of the plate spring 391.

The inflator 32 has a low-profile hollow disc body with gas discharge holes. In the event of a vehicle emergency, the inflator 32 is activated upon receiving a signal from the vehicle sensors and immediately supplies gas to the airbag cushion 30. The airbag cushion 30 supplied with gas rapidly expands, ruptures the module cover 33, expands toward the driver's side of the vehicle interior space, and restrains the driver.

The module cover 33 is formed, for example, of resin and includes a design surface facing the driver side of the steering wheel 1. In addition, the module cover 33 functions as a horn switch that the driver pushes to sound the horn. In detail, when the driver pushes the module cover 33 in the Z-axis negative direction, the airbag module 3 approaches the steering wheel body 2 against the biasing force of the damper unit 4a and the support unit 4b. Here, a movable contact 71 of the horn mechanism 70 provided on the airbag module 3 side comes into contact with the fixed contact 72 of the horn mechanism 70 provided on the steering wheel body 2 side. This contact causes the horn mechanism 70 to enter a horn activated state, sounding the horn. On the other hand, when pushing on the airbag module 3 is released, the airbag module 3 is returned to the original position thereof based on the biasing force of the damper unit 4a and the support unit 4b, causing the horn to enter non-activated state.

The locking plate 34 is, for example, press molded from a single metal plate. The locking plate 34 includes opening parts 34a, 34a at bump portions for separating from the bottom wall 36 of the housing 31 (see FIG. 5). The pins 41 of the damper units 4a are inserted into each of the opening parts 34a. In addition, a bushing 61 of the support unit 4b is secured to a flat plate part of the locking plate 34 and the movable contact 71 of the horn mechanism 70 is arranged more in the Y-axis negative direction than this fixed location.

In other embodiments, the locking plate 34 may be omitted. In this case, the structure and function related to the locking plate 34 are provided on a separate member of the airbag module 3, for example, the housing 31. Furthermore, in the case of having a locking plate 34, the bottom part of the airbag module 3 facing the steering wheel body 2 is primarily composed of the locking plate 34, and in the case of not having the locking plate 34, the bottom part of the airbag module is composed primarily of the bottom wall 36 of the housing 31.

As depicted in FIG. 4, there are a plurality of damper units 4a and support units 4b (two each in this case) respectively, and these are provided on the bottom part of the airbag module 3. Two damper units 4a, 4a are provided on the positive side in the Y-axis direction and two support units 4b and 4b are provided on the negative side in the Y-axis direction at both sides in the X-axis direction. From another perspective, the airbag module 3 can be viewed as an analog 12-hour clock in a plane perpendicular to the Z-axis direction, with damper units 4a, 4a roughly positioned at 2 o'clock and 10 o'clock and support units 4b, 4b at 4 o'clock and 8 o'clock.

Note that the number and arranged locations of the damper units 4a and support units 4b can be set as appropriate. For example, in other embodiments, the number of support units 4b may be three, and they may be positioned at 3 o'clock, 6 o'clock, and 9 o'clock when viewed on an analog 12-hour clock. In addition, the damper unit 4a may be omitted.

Figure 5:
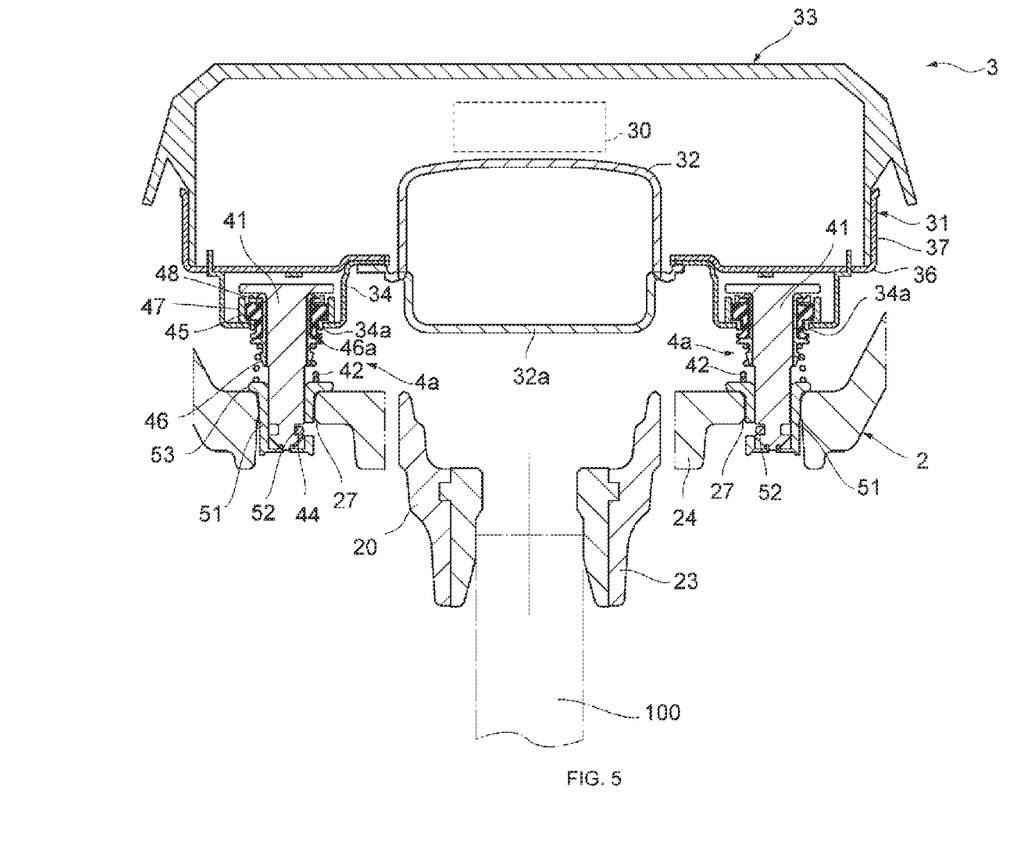
FIG. 5 is a cross section view of a cross section along line V-V of FIG. 1.

As depicted in FIGS. 4 and 5, the damper unit 4a includes a pin 41, a spring 42, and a damper assembly 43 and constitute a module damper that transmits steering wheel body 2 vibration to the airbag module 3. In other words, the damper unit 4a functions as a dynamic damper that dampens vibrations from the vehicle.

The damper assembly 43 is mounted in the opening part 34a of the locking plate 34. The damper assembly 43 includes an elastic body 45, an inner sleeve 46 and outer sleeve 47 that retain the elastic body 45, and an annular piece 48 that covers the upper surface of the elastic body 45. The elastic body 45 is for suppressing steering wheel 1 vibration and is formed in an annular shape out of rubber, silicone, or the like. The inner sleeve 46, outer sleeve 47, and annular piece 48 are composed of, for example, resin, and the elastic body 45 is retained in the spaces surrounded by these.

The pin 41 is slipped into the inner sleeve 46. The inner sleeve 46 is configured to enable sliding in the Z-axis direction relative to the pin 41. An outer sleeve 47 is mounted in the opening part 34a. This manner of mounting secures the damper unit 4a to the bottom part of the airbag module 3. Therefore, when the airbag module 3 moves in the Z-axis direction, the damper assembly 43 also moves in the Z-axis direction together with the airbag module 3 and during this movement, the inner sleeve 46 of the damper assembly 43 moves relative to the pin 41.

The pin 41 extends in the Z-axis direction and is inserted into the opening part 34a inside an inner sleeve 46. The first end of the pin 41 in the Z-axis direction is formed in a flange shape and the upper part of the damper assembly 43 is positioned at the bottom of this flange part. In addition, a second end of the pin 41 in the Z-axis direction is inserted inside the collar 51 and into the mounting hole 27. A retaining spring 52 mounted on the core bar 2a engages with an engaging groove 44 at the tip end part of the pin 41; thereby, the pin 41 is secured to the core metal 2.

The spring 42 is composed of a coil spring provided so as to wrap around the pin 41 and biases the airbag module 3 in a direction separating from the steering wheel body 2. A first end of the spring 42 is retained on a retaining part 46a of the inner sleeve 46 and a second end is a free end. This free end seats on the top of the flange part 53 of the collar 51.

As depicted again in FIG. 4, the support unit 4b includes the bushing 61 and a coil spring 62. The bushing 61 is secured to the locking plate 34. The coil spring 62 biases the airbag module 3 in a direction separating from the steering wheel body 2. The coil spring 62 is composed of a coil spring with a first end retained in the bushing 61 and a second end as a free end. This free end is seated on the seat surface 28 of the boss part 20. The outer diameter of the coil spring 62 is smaller than the outer diameter of the spring 42 of the damper unit 4a.

When mounting (assembling) the airbag module 3 to the steering wheel body 2, first, as depicted in FIGS. 2 and 4, the damper unit 4a and support unit 4b are provided on the airbag module 3. Thereafter, the airbag module 3 is moved in the Z-axis negative direction, the pin 41 of the damper unit 4a is inserted into the collar 51 and engaged with the retaining spring 52 (see FIG. 5). This engagement couples the airbag module 3 to the core bar 2a. In this connected state, the spring 42 of the damper unit 4a and coil spring 62 of the support unit 4b are interposed between the bottom part of the airbag module 3 and the steering wheel body 2 and the airbag module 3 is elastically supported relative to the steering wheel body 2.

Next, the structure of the coil spring 62 and the periphery thereof will be described with reference to FIG. 6. FIG. 6(a) depicts a state of the coil spring 62 prior to mounting the airbag module 3 to the steering wheel body 2 and FIG. 6(b) depicts a state of the coil spring 62 after mounting the airbag module 3 to the steering wheel body 2.

The coil spring 62 includes a first spring end part 81 on the airbag module 3 side and a second spring end part 82 on the steering wheel body 2 side. The first spring end part 81 and the second spring end part 82 are respectively positioned at both ends of the coil spring 62. In a state prior to mounting the airbag module 3 to the steering wheel body 2, the first spring end part 81 is at a fixed end and the second spring end part 82 is at a free end. Here, the first spring end part 81 is retained on a bushing 61 secured to the bottom of the airbag module 3. In addition, the second spring end part 82 is seated on a seat surface 28 of the steering wheel body 2 when the airbag module 3 is mounted to the steering wheel body 2.

The coil spring 62 is composed of, for example, a compression coil spring. The coil spring 62 has a plurality of spring windings and the first spring end part 81 and the second spring end part 82 include a winding seat portion in the coil spring. The winding seat is, for example, 1.0 windings but is not limited to this and may be, for example, 1.5 windings or the like.

A coil spring 62 is arranged between the steering wheel body 2 and the airbag module 3 in a state of the axis line thereof offset from a free state.

Figure 6:
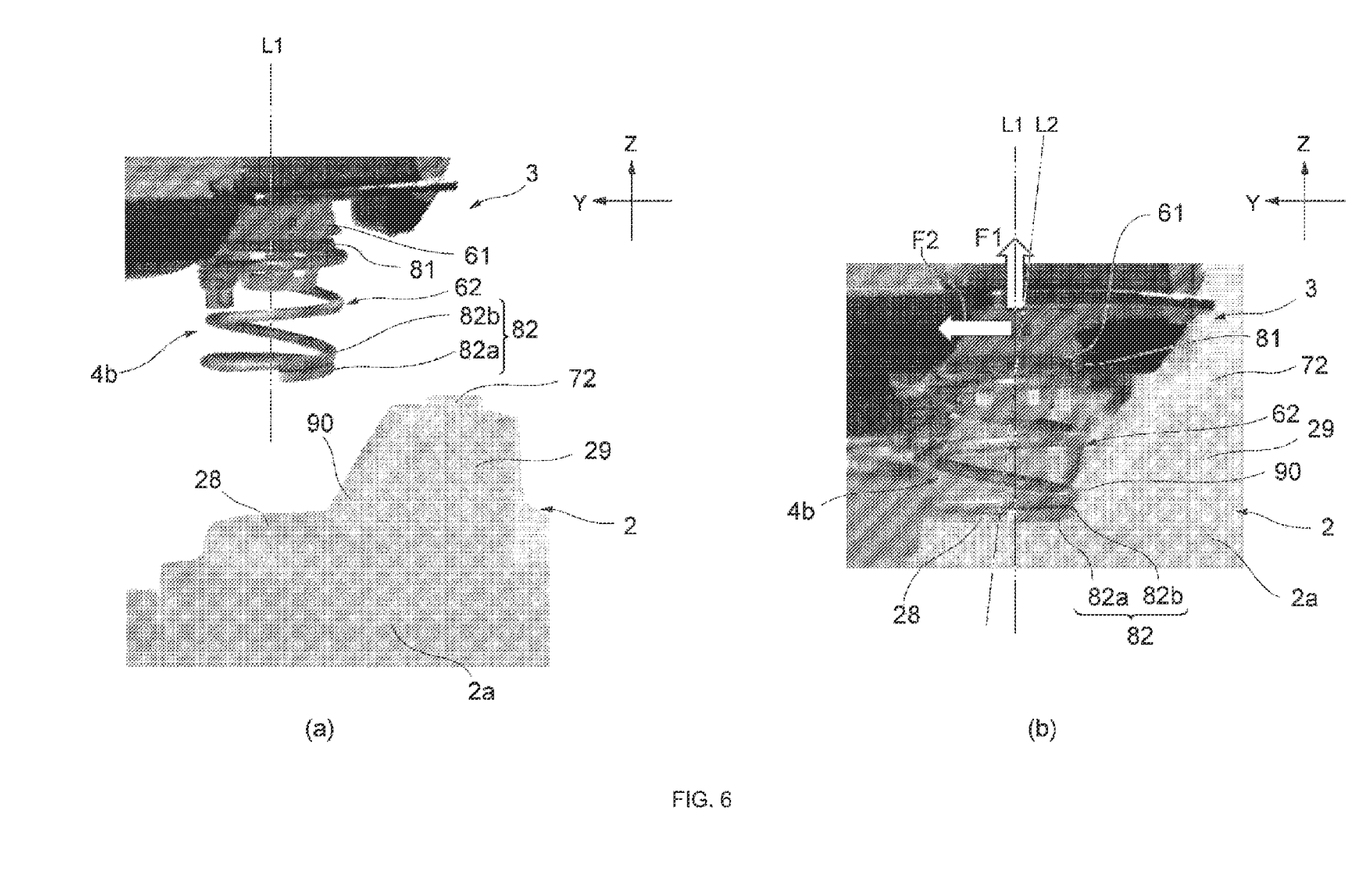
FIG. 6 depicts a configuration around the coil spring of the steering wheel body of FIG. 1, where (a) depicts a state of the coil spring prior to mounting the airbag module to the steering wheel body and (b) depicts a state of the coil spring after mounting the airbag module to the steering wheel body.

Specifically, as depicted in FIG. 6(a), when the coil spring 62 is in a free state, the axis line L1 of the coil spring 62 extends parallel in the Z-axis direction. The axis line L1 is a center line (coil spring axis) that passes through the center of the coil spring 62 and passes through the center of winding seats at both ends of the coil spring 62.

On the other hand, as depicted in FIG. 6(b), with the airbag module 3 mounted on the steering wheel body 2, the axis line L2 of the coil spring 62 is offset from the axis line L1 in the free state. Similar to the axis line L1, the axis line L2 is a center line that passes through the center of the coil spring 62 and passes through the center of the winding seats at both ends of the coil spring 62 but is inclined slight with respect to the Z-axis direction. Here, the axis line L2 is inclined relative to the Z-axis direction such that the center of the first spring end part 81 is positioned in the Y-axis negative direction more than the center of the second spring end part 82. In this manner, in the offset state, the first spring end part 81 and second spring end part 82 are arranged offset in a direction orthogonal to the axis line L1 in a free state (here, Y-axis direction).

The coil spring 62 arranged in an offset state applies a bias in a direction (here, Y-axis direction) that intersects with the axis line L1 in the free state. Therefore, the coil spring 62 not only applies a force F1 on the airbag module 3 in a direction separating from the steering wheel body 2, but also applies a force F2 in a direction (positive Y-axis direction) that intersects with the axis line L1 in the free state. The resultant force of the force F1 and the force F2 is in a direction that intersects with the mounting direction of the airbag module 3 (first direction, Z-axis direction), and is a direction that pushes up the airbag module 3. Therefore, the coil spring 62 suppresses hanging down of the airbag module 3 relative to the steering wheel body 2 due to its own weight.

Here, a structure is provided to ensure the coil spring 62 is offset with respect to the steering wheel body 2.

For example, the steering wheel body 2 includes an interference portion 90. The interference portion 90 is configured to offset the second spring end part 82 relative to the first spring end part 81 in a direction orthogonal to the axis line L1 (here, Y-axis direction) of the coil spring 62. For example, of the coil spring 62, the interference portion 90 is only in contact with the second spring end part 82; therefore, pushing the second spring end part 82 in the Y-axis positive direction causes position offset relative to the first spring end part 81. This places the coil spring 62 in an offset state. Note that the amount of interference based on the interference portion 90 (pushing force on the second spring end part 82 toward the Y-axis positive side) can be set with consideration for the spring constant of the coil spring 62.

The interference portion 90 can have one or a plurality of interference points relative to the second spring end part 82. For example, the interference portion 90 can be configured to contact the second spring end part 82 two contiguous wire portions 82a and 82b in the axis direction of the coil spring 62. The wire portions 82a and 82b is a part of the spring wire material that constitutes the coil spring 62. In addition, the wire portions 82a and 82b constitute the windings of the spring and the wire portion 82b constitutes the next winding relative to the wire portion 82a. Here, the wire portion 82a is the winding seat portion of the coil spring 62.

The interference portion 90 may be formed on the core bar 2a of the steering wheel body 2 or may be provided as a member separate from the core bar 2a on the steering wheel body 2. Here, the interference portion 90 is formed as a protruding part on the core bar 2a rising from a location close to the seat surface 28. In detail, the interference portion 90 is formed at the root part of the protruding part 29 of the core bar 2a. The surface of the protruding part 29 in the Y-axis positive direction is inclined such that the upper end is positioned more in the Y-axis negative direction than the lower end and the root part thereof (lower end) functions as the interference portion 90.

The interference portion 90 comes into contact with the second spring end part 82 of the coil spring 62 when the airbag module 3 is mounted to the steering wheel body 2. Through this manner of contact, the second spring end part 82 is received on the seat surface 28 offset in a direction perpendicular to the axis line L1 (here, Y-axis positive direction). As a result, the axis line L2 of the coil spring 62 is inclined from the axis line L1.

The seat surface 28 includes a flat surface in a direction perpendicular to the axis line L1 and the second spring end part 82 is seated on this flat surface of the seat surface 28. In another embodiment, the seat surface 28 may include a positioning part for positioning the second spring end part 82. For example, the seat surface 28 may include a positioning part for receiving or mating with the wire portion 82a of the second spring end part 82 on, or in the vicinity of, the flat surface. Providing of the positioning part enables stabilizing the position of the coil spring 62 by means of the bias.

The effects of the present embodiment described above will be described.

As described above, the steering wheel 1 according to the embodiment, includes:
 a steering wheel body 2;
 an airbag module 3; and
 at least one coil spring 62 that biases the airbag module in a direction away from the steering wheel body; wherein the coil spring 62 is arranged between the steering wheel body 2 and the airbag module 3 with the axis line of the coil spring in a state offset from that of a free state thereof; thereby also applying a force to the airbag module 3 in a direction that intersects the axis line L1 of the coil spring in a free state.

With this aspect, the coil spring 62 arranged in an offset state applies a bias in a direction (here, Y-axis direction) that intersects with the axis line L1 in the free state. Therefore, the coil spring 62 also applies a force biasing the airbag module 3 in the Y-axis positive direction in addition to the Z-axis positive direction for separating from the steering wheel body 2. In other words, the resultant force of the coil spring 62 arranged in the offset state in the Y-axis positive direction and in the Z-axis positive direction acts on the airbag module 3. Thus, the airbag module 3 is pushed up, suppressing the airbag module 3 from hanging down relative to the steering wheel body 2 due to its own weight and the position of the airbag module 3 is oriented in the original mounting position (in particular, Y-axis direction position) relative to the steering wheel body 2.

Therefore, this contributes to stabilizing the position of the airbag module 3. Thus, for example, enabling retaining the original positional relationship of the airbag module cover 33 and the steering wheel body 2 and achieving improvement in the design of the steering wheel 1 as a whole. In addition, the characteristics of the coil spring 62 interposed between the steering wheel body 2 and the airbag module 3 can be effectively used to achieve stabilization of the airbag module 3 position. Of the existing steering wheels, there are some that have a coil spring interposed between the steering wheel body and the airbag module; therefore, effective use of this existing coil spring enables stabilizing the position of the airbag module 3.

In addition, with the embodiment, the coil spring 62 is arranged so that the first spring end part 81 and second spring end part 82 thereof are arranged in a direction orthogonal to the axis line L1 thereof. In this manner, offsetting of the axis line of the coil spring 62 provides a simple method to offset both ends of the coil spring 62 in a direction orthogonal to the axis line L1.

In addition, with this embodiment, the steering wheel body 2 includes an interference portion 90 that offsets the second spring end part 82 in a direction orthogonal to the axis line L1 relative to the first spring end part 81. Thus, the coil spring 62 can be set to an offset state based on the configuration provided on the steering wheel 2 [sic] side.

In addition, according to the embodiment, the interference portion 90 is formed on the core bar 2a that forms the skeletal structure of the steering wheel body 2. Thus, the core bar 2*a* can be effectively used to provide the interference portion 90 for establishing the coil spring 62 in the offset state.

In addition, with the embodiment, the interference portion 90 is formed as the protruding part rising up from the vicinity of the seat surface 28 for receiving the second spring end part 82. Thus ensuring rigidity and strength of the interference portion 90. In addition, with the embodiment, the protruding part in question is the root part of the protruding part 29 providing the fixed contact 72 of the horn mechanism 70. Therefore, the structure used as the horn mechanism 70 can be effectively used to establish the coil spring 62 in the offset state.

In addition, with the embodiment, the interference portion 90 is configured to contact at least two of the wire portions 82*a* and 82*b* of the second spring end part 82. Thus enabling increasing the contact surface area (interference surface area) of the interference portion 90 and stabilizing or reliably pushing on the second spring end part 82.

In addition, with the embodiment, the coil spring 62 is positioned on the lower side as viewed from the center of the airbag module 3. Thus, hanging down of the airbag module 3 relative to the steering wheel body 2 due to its own weight can be effectively suppressed. In addition, even with the damper units 4*a*, 4*a* positioned above as viewed from the center of the airbag module 3, the position of the airbag module 3 and the steering wheel body 2 (position in the Y-axis direction) is stabilized so the damping effect by the damper units 4*a*, 4*a* is stabilized.

In addition, with the embodiment, the coil springs 62 are respectively positioned on both the right and left sides as viewed from the center of the airbag module 3. Thus enabling pushing up the airbag module 3 in a balanced manner in the left-right direction.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed.

For example, the number of coil springs 62 is not limited to two and may be three or more, or may be one. In the case of one, the coil spring 62 may be arranged in the 6 o'clock direction on an analog 12 hour clock.

In addition, the interference portion 90 may be provided on the airbag module 3 side rather than on the steering wheel body 2 side. For example, the interference portion may be provided on the bottom part of the airbag module 3 and this interference portion may offset the first spring end part 81 in a direction orthogonal to the axis line L1 of the coil spring 62 relative to the second spring end part 82.

EXPLANATION OF CODES

1. Steering wheel; 2. Steering wheel body; 2*a*. Core bar; 3. Airbag module; 4*a*. Damper unit; 4*b*. Support unit; 20. Boss part; 21. Rim part; 22. Spoke part; 23. Shaft mounting part; 24. Base part; 25. Inclined part; 26. Bridging part; 26*a*. Tab engaging part; 27. Mounting hole; 28. Seat surface; 29. Protruding part; 29*a*. Top surface; 30. Airbag cushion; 31. Housing; 32. Inflator; 32*a*. Securing plate; 33. Module cover; 34. Locking plate; 34*a*. Opening part; 36. Bottom wall; 37. Peripheral wall; 39. Tab; 41. Pin; 42. Spring; 43. Damper assembly; 44. Engaging groove; 45. Elastic body; 46. Inner sleeve; 46*a*. Retaining part; 47. Outer sleeve; 48. Annular piece; 51. Collar; 52. Retaining spring; 53. Flange part; 61. Bushing; 62. Coil spring; 70. Horn mechanism; 71. Movable contact; 72. Fixed contact; 81. First spring end part; 82. Second spring end part; 82*a*, 82*b*. Wire portion; 90. Interference portion; 100. Steering Shaft; 391. Plate spring; 392. Insulator; 394. Receiving opening; F1, F2. Force; L1. Axis line in free state; L2. Axis line in offset state;

The invention claimed is:

1. A steering wheel, comprising:
   a steering wheel body including a core bar that forms a skeletal structure of the steering wheel body;
   an airbag module; and
   at least one coil spring that biases the airbag module in a direction away from the steering wheel body, the at least one coil spring including a first spring end part on the airbag module side and a second spring end part on the steering wheel body side,
   wherein the at least one coil spring is arranged between the steering wheel body and the airbag module with the first spring end part and the second spring end part of the at least one coil spring are arranged offset in a direction orthogonal to the axis line of the coil spring in a free state of the coil spring such that an axis line of the coil spring is offset from that of the free state, thereby also applying a force to the airbag module in a direction that intersects the axis line of the coil spring in the free state, and
   wherein the steering wheel body includes an interference portion formed on the core bar, the interference portion configured to offset the second spring end part in the orthogonal direction relative to the first spring end part.

2. The steering wheel according to claim 1, wherein the core bar includes a seat surface for receiving the second spring end part and the interference portion is formed as a protruding part rising up near the seat surface.

3. The steering wheel according to claim 1, wherein the interference portion is configured to contact at least two consecutive wire portions in the axis line direction of the coil spring at the second spring end part.

4. The steering wheel according to claim 3, wherein the at least two wire portions include a winding seat portion of the coil spring.

5. The steering wheel according to claim 1, wherein the first spring end part is secured to the airbag module, the second spring end part is not secured to the steering wheel body, and the second spring end part is configured to contact the interference portion when the airbag module is mounted on the steering wheel body and be received on the seat surface of the steering wheel body, offset in the orthogonal direction.

6. The steering wheel according to claim 5, wherein the seat surface of the steering wheel body includes a flat surface in the orthogonal direction.

7. The steering wheel according to claim 5, wherein the seat surface of the steering wheel body includes a positioning part for positioning the second spring end part.

8. The steering wheel according to claim 5, wherein the airbag module is mounted to the steering wheel body facing in a first direction and the at least one coil spring applies a force to the airbag module in a direction pushing up the airbag module in a direction that intersects with the first direction.

9. The steering wheel according to claim 8, wherein the first direction is the axis line direction with the coil spring in a free state.

10. The steering wheel according to claim 1, wherein the airbag module includes a second interference portion that offsets the first spring end part in the orthogonal direction relative to the second spring end part.

11. The steering wheel according to claim 1, wherein the at least one coil spring is positioned to the lower side, as viewed from the center of the airbag module.

12. A steering wheel, comprising:
a steering wheel body;
an airbag module; and
at least one coil spring that biases the airbag module in a direction away from the steering wheel body, the at least one coil spring including a first spring end part on the airbag module side and secured to the airbag module and a second spring end part on the steering wheel body side and not secured to the airbag module,
wherein the at least one coil spring is arranged between the steering wheel body and the airbag module with the first spring end part and the second spring end part of the at least one coil spring are arranged offset in a direction orthogonal to the axis line of the coil spring in a free state of the coil spring such that an axis line of the coil spring is offset from that of the free state, thereby also applying a force to the airbag module in a direction that intersects the axis line of the coil spring in the free state,
wherein the steering wheel body includes an interference portion configured to offset the second spring end part in the orthogonal direction relative to the first spring end part,
wherein the second spring end part is configured to contact the interference portion when the airbag module is mounted on the steering wheel body and be received on a seat surface of the steering wheel body, offset in the orthogonal direction, wherein the seat surface of the steering wheel body includes a flat surface in the orthogonal direction.

13. The steering wheel according to claim 12, wherein the interference portion is configured to contact at least two consecutive wire portions in the axis line direction of the coil spring at the second spring end part.

14. The steering wheel according to claim 13, wherein the at least two wire portions include a winding seat portion of the coil spring.

15. The steering wheel according to claim 12, wherein the seat surface of the steering wheel body includes a positioning part for positioning the second spring end part.

16. The steering wheel according to claim 12, wherein the airbag module is mounted to the steering wheel body facing in a first direction and the at least one coil spring applies a force to the airbag module in a direction pushing up the airbag module in a direction that intersects with the first direction.

17. The steering wheel according to claim 16, wherein the first direction is the axis line direction with the coil spring in a free state.

18. The steering wheel according to claim 12, wherein the airbag module includes a second interference portion that offsets the first spring end part in the orthogonal direction relative to the second spring end part.

19. The steering wheel according to claim 12, wherein the at least one coil spring is positioned to the lower side, as viewed from the center of the airbag module.

* * * * *